(12) United States Patent
Mirichigni (10) Patent No.: US 9,009,394 B2
(45) Date of Patent: *Apr. 14, 2015

(54) SERIAL FLASH MEMORY WITH A CONFIGURABLE NUMBER OF DUMMY CLOCK CYCLES

(75) Inventor: Graziano Mirichigni, Pietracamela (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,993

(22) Filed: Aug. 20, 2012

(65) Prior Publication Data

US 2012/0324151 A1    Dec. 20, 2012

Related U.S. Application Data

(63) Continuation of application No. 12/347,510, filed on Dec. 31, 2008, now Pat. No. 8,250,287.

(51) Int. Cl.
*G06F 13/00* (2006.01)
*G06F 13/28* (2006.01)

(52) U.S. Cl.
CPC ............... *G06F 13/00* (2013.01); *G06F 13/28* (2013.01)

(58) Field of Classification Search
USPC ............ 711/103; 710/65; 365/185.05, 185.09
See application file for complete search history.

(56) References Cited

U.S. PATENT DOCUMENTS

| 4,555,763 | A | 11/1985 | Dahme |
| 8,630,128 | B2 | 1/2014 | Hung et al. |
| 2004/0228196 | A1* | 11/2004 | Kwak et al. ............... 365/230.03 |
| 2006/0067123 | A1 | 3/2006 | Jigour et al. |
| 2006/0218323 | A1 | 9/2006 | Chen et al. |
| 2008/0144406 | A1* | 6/2008 | Park et al. ................... 365/193 |
| 2008/0259700 | A1* | 10/2008 | Hatakeyama ................. 365/195 |
| 2009/0161429 | A1 | 6/2009 | Chen et al. |

FOREIGN PATENT DOCUMENTS

JP        63068955 A  *  3/1988  .............. G06F 13/12

OTHER PUBLICATIONS

MX25L1635D Datasheet, Macronix International Co., Ltd., Rev. 1.3, 50 pages, Jul. 8, 2008.
W25Q80, W25Q16, W25Q32 Winbond Spiflash, Preliminary—Revision B, 61 pages, Sep. 26, 2007.
Serial Quad I/O (SQI) Flash Memory SST26VF016/SST26VF032, Silicon Storage Technology, Inc., 34 pages, Apr. 2008.
USPTO; Office Action dated Sep. 6, 2011, from related application U.S. Appl. No. 12/347,510, filed Dec. 31, 2008.

* cited by examiner

*Primary Examiner* — Mardochee Chery
(74) *Attorney, Agent, or Firm* — Knobbe Martens Olson & Bear LLP (57) ABSTRACT

Apparatus and methods configure a serial flash memory device. A value in a configuration register configures the number of dummy clock cycles to provide prior providing data in response to a read command. The value in the configuration register is read, and the number of dummy clock cycles to provide based at least partly on the dummy clock cycle value.

18 Claims, 8 Drawing Sheets

SERIAL FLASH MEMORY WITH A CONFIGURABLE NUMBER OF DUMMY CLOCK CYCLES

PRIORITY APPLICATION

This application is a continuation of U.S. application Ser. No. 12/347,510, filed Dec. 31, 2008 (U.S. Pat. No. 8,250,287), the entire disclosure of which is incorporated by reference herein.

BACKGROUND

Subject matter disclosed herein may relate flash memory devices, and may relate more particularly to enhancing throughput for serial flash memory devices.

Non-volatile memory devices, including Flash memory devices, may be found in a wide range of electronic devices. In particular, Flash memory devices may be used in computers, digital cameras, cellular telephones, personal digital assistants, etc. For many applications, flash memory devices may store instructions to be executed on a processor, and in at least some of these applications, the processor may fetch instructions from the flash memory devices, such as, for example, in execute-in-place (XiP) implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized. Furthermore, structural or logical changes may be made without departing from the scope of claimed subject matter. It should also be noted that directions or references, for example, up, down, top, bottom, and so on, may be used to facilitate discussion of the drawings and are not intended to restrict the application of claimed subject matter. Therefore, the following detailed description is not to be taken to limit the scope of claimed subject matter or their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description which follow are presented in terms of algorithms or symbolic representations of operations on data bits or binary digital signals stored within a computing platform memory, such as a computer memory. These algorithmic descriptions or representations are examples of techniques used by those of ordinary skill in the data processing arts to convey the substance of their work to others skilled in the art. An algorithm here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform. Further, unless specifically stated otherwise, processes described herein, with reference to flow diagrams or otherwise, may also be executed and/or controlled, in whole or in part, by such a computing platform.

As discussed above, for many applications, flash memory devices may store instructions to be executed on a processor, and in at least some of these applications, the processor may fetch instructions from the flash memory devices, such as, for example, in execute-in-place (XiP) implementations. As used herein, the term "execute-in-place", along with its abbreviation "XiP", relates to a processor fetching instructions from a long term storage device, such as, for example, a flash memory, rather than fetching instructions from an intermediate storage, such as, for example, a dynamic random access memory (DRAM).

Flash memory may be characterized at least in part by the ability to be electrically erasable and programmable, and may be utilized in a very wide range of electronic device types, including, but not limited to, digital cameras, cellular telephones, personal digital assistants, portable navigation devices, portable music players, notebook computers, desktop computers, etc., to name but a few examples. Also, flash memory devices may comprise either parallel data interfaces or serial interfaces. Parallel interfaces, in at least some instances, may allow for relatively good data throughput due at least in part to increased numbers of input/output terminals. Serial interfaces, on the other hand, may provide reduced costs due at least in part to reduced numbers of input/output terminals. As system designers seek to provide increased performance while reducing costs, it may be advantageous to enhance the throughput of serial flash memory devices. Embodiments described herein may enhance throughput for serial flash memory devices. For one or more embodiments, a streaming mode for read commands may be provided, as discussed below.

Figure 1:
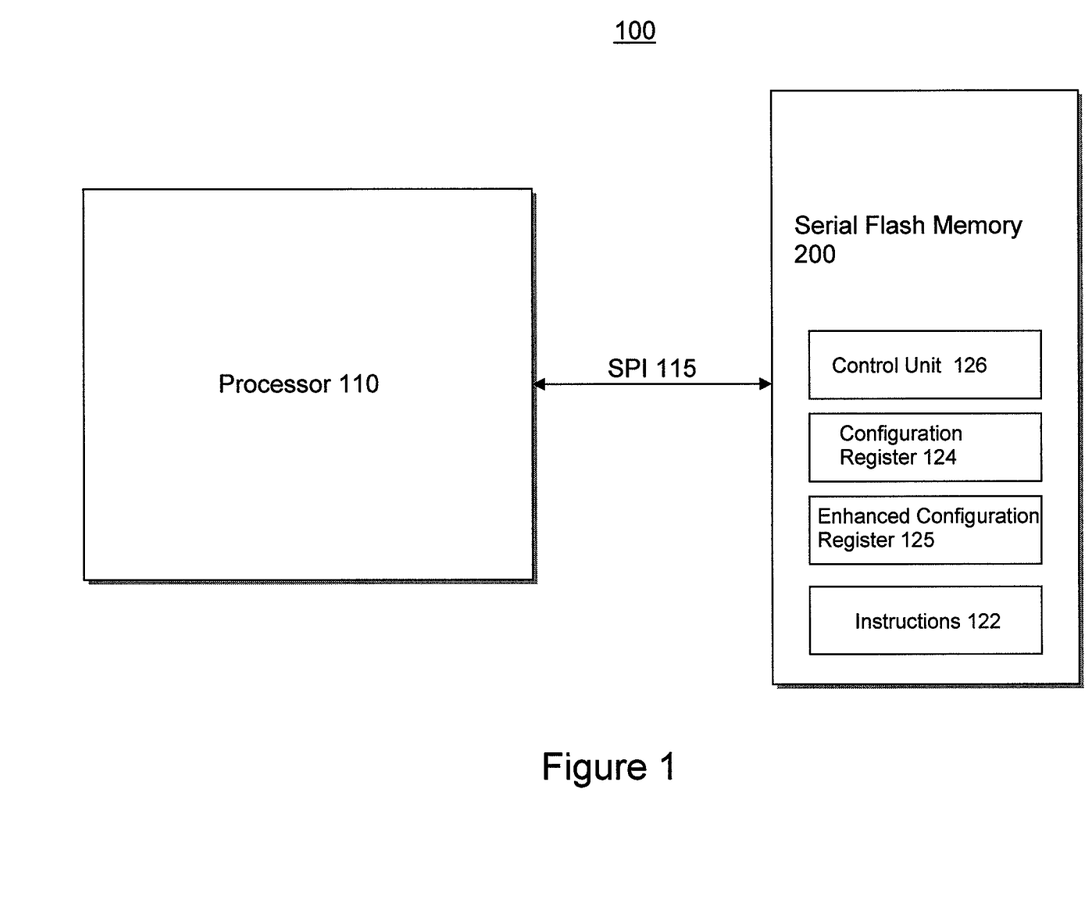
FIG. 1 is a block diagram of an example embodiment of a computing platform.

FIG. 1 is a block diagram of an example embodiment of a computing platform 100, comprising a processor 110 and a serial flash memory 200. Memory 200 for this example is coupled to processor 110 by way of a serial peripheral interface (SPI) 115, as discussed more fully below. For one or more embodiments, Serial Flash Memory 200 may comprise a control unit 126 and a configuration register 124. Further, memory 200 may store instructions 122 that may comprise code for any of a wide range of possible operating systems and/or applications. The instructions may be executed by processor 110. Note that for this example, processor 110 and memory 200 are configured as an execute-in-place (XiP) type implementation, where processor 110 may fetch instructions directly from a long-term storage device.

For one or more embodiments, control unit 126 may receive one or more signals from processor 110 and may generate one or more internal control signals to perform any of a number of operations, including data read operations, by which processor 110 may access instructions 122, for example. As used herein, the term "control unit" is meant to include any circuitry or logic involved in the management or execution of command sequences as they relate to flash memory devices.

The term "computing platform" as used herein refers to a system or a device that includes the ability to process or store data in the form of signals. Thus, a computing platform, in this context, may comprise hardware, software, firmware or any combination thereof. Computing platform 100, as depicted in FIG. 1, is merely one such example, and the scope of claimed subject matter is not limited in these respects. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, and so on. Further, unless specifically stated otherwise, a process as described herein, with reference to flow diagrams or otherwise, may also be executed or controlled, in whole or in part, by a computing platform. For the example embodiments described herein, computing platform 100 may comprise a cellular telephone, although again, the scope of claimed subject matter is not so limited.

Figure 2A:
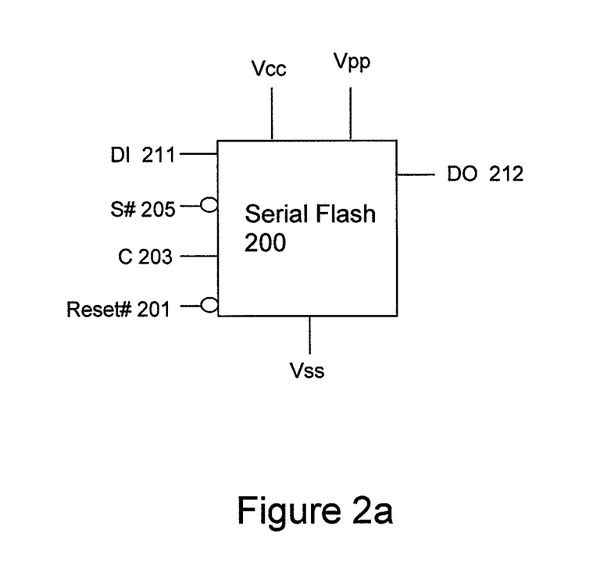
FIG. 2a is a block diagram depicting an example embodiment of a serial flash memory device configured for single input and single output operation.
Figure 2B:
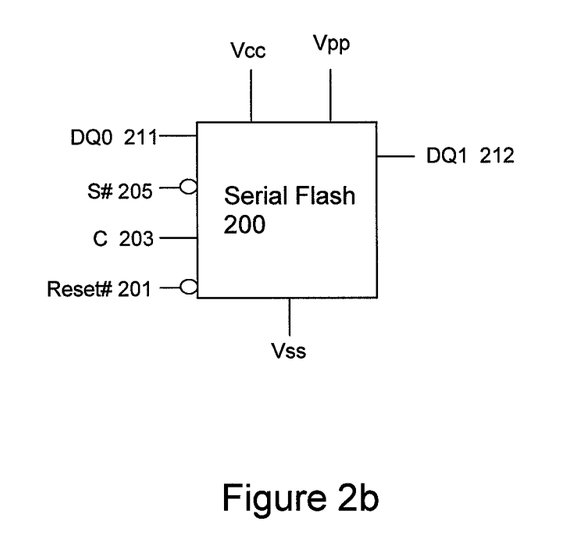
FIG. 2b is a block diagram depicting an example embodiment of a serial flash memory device configured for dual input/output operation.
Figure 2C:
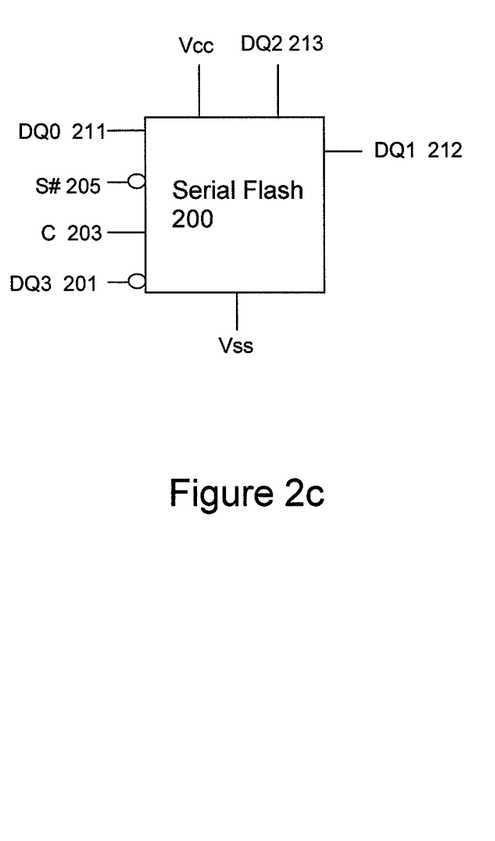
FIG. 2c is a block diagram depicting an example embodiment of a serial flash memory device configured for quad input/output operation.

As mentioned above, for an embodiment, processor 110 may be coupled to serial flash memory 200 by way of a serial peripheral interface 115. The term "serial peripheral interface" for an embodiment refers to a de facto standard for serial communications between components in some electronic devices. SPI 115 may comprise a number of signals, as will be discussed more fully below, including a clock signal, input/output signals, and a slave select signal. FIGS. 2a through 2c below, describe several modes of operation for SPI 115 as it related to serial flash memory device 200, including single input/output interface operations, dual input/output interface operations, and quad input/output interface operations.

FIG. 2a is a block diagram depicting an example embodiment of a serial flash memory device configured for single input/output (I/O) interface operations. Serial flash memory 200 may comprise a terminal Vcc to be coupled to a power source, and a terminal Vpp that may also be coupled to a power source, but which may also have other purposes in other configurations, as discussed below. Memory 200 may also include a terminal Vss that may provide an electrical connection to a ground signal. Serial flash memory 200 for this example may also comprise a data input terminal DI 211 and a data output terminal DO 212, as well as a Reset# signal terminal 201, a clock C signal terminal 203, and a Slave (S#) signal 205. If serial flash memory 200 is operating in the single input single output mode, information may be shifted into the memory via DI 211, and may be shifted out of the memory via DO 212.

For an embodiment, an SPI command sequence may begin with a one byte command code that may be initiated with a falling edge of S#205. The 8 bit command code may be latched into DI 211, most significant bit (MSB) first, for an example embodiment, on a rising edge of C 203. Depending on the particular command code, the command code may be followed by additional address bytes, followed by dummy bytes and/or data bytes. The total number of input cycles for a command depends on the particular command code. Further, for this example, address bits may be latched at DI 211 on the rising edge of C. Also, cycles during which undefined (don't care) data are shifted onto DI 211 may be referred to as dummy clock cycles. Also, for an embodiment, as with the command code, the address, dummy, and data bytes are latched at DI 211 most significant bit first, for this example, although the scope of claimed subject matter is not limited in this respect.

Further, for an embodiment, depending upon the particular command code, data bytes may either be latched as input data at DI 211 or transmitted as output data from DO 212. For cycles that input data through DI 211, DO 212 may be set to a high impedance (Z) state.

Also for an embodiment, a rising edge of S#205 may signal an end to the command sequence and may initiate a resetting of the SPI interface. A de-assertion of S# may also result in a termination of the output data stream for read operations, may bring DO 212 to a high Z state, and may also result in memory 200 entering a standby mode. Of course, these are merely examples of the possible results of a de-assertion of S#205, and the scope of claimed subject matter is not limited in these respects. For one or more embodiments, S#205 may be utilized to initiate program or erase operations and to abort command sequences, to name but a couple of examples.

FIG. 2b is a block diagram depicting an example embodiment of serial flash memory device 200 configured as a dual input/output interface. During a dual I/O command sequence, DQ0 211 and DQ1 212 may be referred to as DQ0 211 and DQ1 212, and may be utilized as either input or output terminals, depending on the state of the command sequence. Information may be latched into DQ0 211 and DQ1 212 on the rising edge of C 203, and information may be shifted out of terminals DQ0 211 and DQ1 212 on the falling edge of C 203.

A Dual Input Fast Program (DIFP) command, for an embodiment, makes it possible to program up to 256 bytes using terminals DQ0 211 and DQ1 212 concurrently as data input terminals. At the beginning of the command sequence, DQ0 211 may be used to latch the command code and address information.

A Dual Output Fast Read (DOFR) command, for an embodiment, makes it possible to read a data byte using two terminals DQ1 212 and DQ0 211 concurrently. Transmitting the information over two lines instead of one may effectively double the data transfer throughput compared to the Fast Read Data Bytes (Fast Read) command. DQ0 211 may be used to latch the command code and address information, for an embodiment.

Also, for an embodiment, a Dual I/O Fast Read (DIOFR) command may share many similarities with the DOFR command, discussed above, but it may also allow the input of the address using DQ0 211 and DQ1 212 concurrently as data output terminals. As with the commands discussed above, DQ0 211 may be used to latch the command code and address information.

FIG. 2c is a block diagram depicting an example embodiment of serial flash memory device 200 configured for quad input/output operations. For Quad I/O command sequences, for an embodiment, DQ0 211 and DQ1 212 terminals may be used as input and output terminals. Information may be latched on the rising edge of C 203, and information may be shifted out onto the terminals on the falling edge of C 203. During a quad I/O command sequence, at least in part in response to receiving the command code, the Vpp and Reset#201 terminals may be re-purposed as input/output terminals DQ2 213 and DQ3 201, respectively.

For an embodiment, a Quad I/O Fast Read Data Bytes (QIOFR) command may allow reading information using four pins DQ3 201, DQ2 213, DQ1 212, and DQ0 211 concurrently as data output terminals. Transmitting data on four terminals instead of one may greatly improve throughput compared to the Fast Read command, noted above. For the QIOFR command, it may also be possible to receive the address over the same four terminals. As with other commands discussed above, DQ0 211 may be used to receive the command code.

Various configurations for serial flash memory 200 among those discussed above, along with various examples of command sequences including streaming read operations, are revisited below. Also, it should be noted that the operations, command sequences, and serial flash memory device configurations described herein are merely examples, and the scope of claimed subject matter is not limited in this respect.

Figure 3:
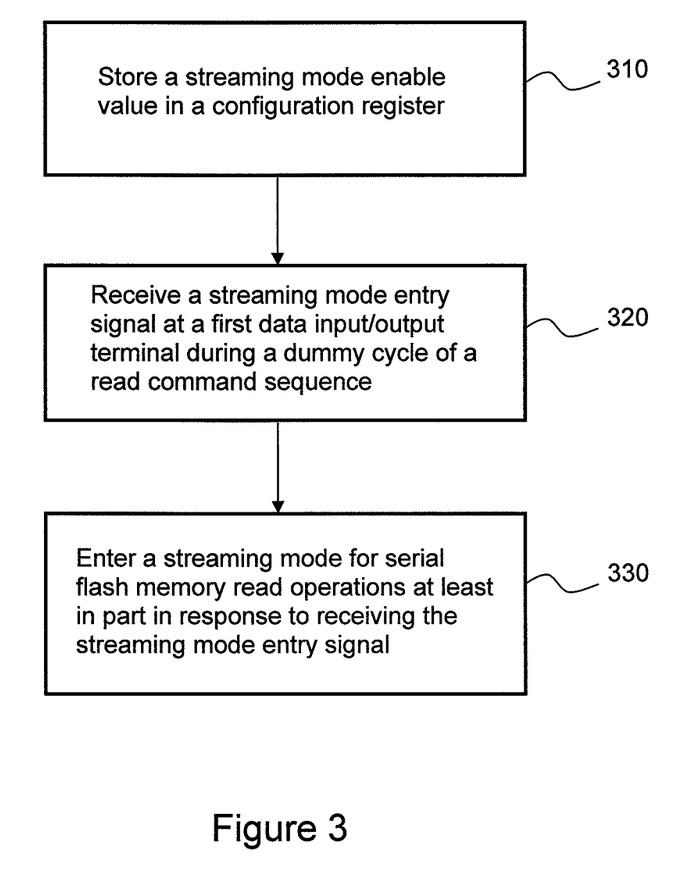
FIG. 3 is a flow diagram of an example embodiment of a method for enhancing throughput for a serial flash memory device.

FIG. 3 is a flow diagram of an example embodiment of a method for enhancing throughput for a serial flash memory device. At block 310, a streaming mode enable value may be stored in a configuration register. That is, a bit in the configuration register may be set in order to enable streaming read operations. For an embodiment, the configuration register value does not cause the memory device to enter a streaming mode of operation, but rather enables the possibility to enter such a mode if an appropriate signal is received, as discussed in connection with block 320. At block 320, a streaming mode entry signal may be received at a first data input/output terminal during the first dummy clock cycle of a read command sequence, and at block 330 a streaming mode is entered for serial flash memory read operations at least in part in response to receiving the streaming mode entry signal. For an embodiment, if the streaming mode enable value is not stored in the configuration register, the memory device will ignore the received streaming mode entry signal. Of course, the above is merely an example of entering a streaming mode for read operations, and the scope of claimed subject matter is not limited to these specific details. For example, embodiments in accordance with claimed subject matter may include all, less than, or more than, blocks 310-330. Also, the order of blocks 310-330 is merely and example order, and the scope of claimed subject matter is not limited in this respect.

Various aspects of example embodiments related to the streaming mode for read operations mentioned above are discussed below. A number of details are provided for one or more example embodiments, including tables and diagrams describing various command sequences and memory configurations. However, it should be noted that any number of other embodiments are possible using a wide range of variations from these example embodiments, and are within the scope of claimed subject matter.

As mentioned above, and as depicted in FIG. 1, serial flash memory device 200 may comprise a configuration register 124 and a control unit 126. Configuration register 124 may be used to define the number of dummy clock cycles to include in such command sequences as, for example, Read Common Flash memory Interface (RCFI), Read Electronic Signature (RES), Read One-Time Programmed (ROTP), Fast Read Data Bytes (Fast Read), Dual Output Fast Read Data Bytes (DOFR), Dual I/O Fast Read Data Bytes (DIOFR), Quad Output Fast Read Data Bytes (QOFR) and Quad I/O Fast Read Data Bytes (QIOFR) commands.

Configuration register 124 for an embodiment may be set through the Write to Configuration Register (WRCR) command. The configuration register configuration for one or more embodiments is described in table 1, below:

TABLE 1

Configuration Register

| Bit | Parameter | Value | Description | Note |
|---|---|---|---|---|
| CR7-CR4 | Dummy Clock Cycles | 0000 | 0 | For RCFI, RES, ROTP, FAST_READ, DOFR, DIOFR, QOFR, QIOFR Commands |
| | | 0001 | 1 | |
| | | 0010 | 2 | |
| | | 0011 | 3 | |
| | | 0100 | 4 | |
| | | 0101 | 5 | |
| | | 0110 | 6 | |
| | | 0111 | 7 | |
| | | 1000 | 8 | |
| | | 1001 | 9 | |
| | | 1010 | 10 | |
| | | 1011 | Reserved | |
| | | 1100 | Reserved | |
| | | 1101 | Reserved | |
| | | 1110 | Reserved | |
| | | 1111 (Default) | Targeted on maximum allowed frequency $f_C$ (104 MHz) and to ensure backward compatibility | 8 dummy clock cycles for RCFI, RES, ROTP, FAST_READ, DOFR, DIOFR, QOFR Commands. 10 dummy clock cycles for QIOFR Command |
| CR3 | Streaming Mode | 0 | Enabled | For FAST_READ, DOFR, DIOFR, QOFR, QIOFR Commands |
| | | 1 (Default) | Disabled | |
| CR2 | Reserved | Reserved | Reserved | |
| CR1-CR0 | Read Length | 00 | Reserved | |
| | | 01 | 16-Byte wrap | |
| | | 10 | 32-Byte wrap | |
| | | 11 (Default) | Continuous | |

For an embodiment, the default number of dummy clock cycles for a read command sequence may be selected with respect to the maximum allowed frequency $f_C$ (i.e. 104 MHz) and to help ensure backward compatibility with legacy products. Default values for an example embodiment may comprise eight dummy clock cycles for Fast Read, DOFR, DIOFR, and QOFR command sequences, and ten for a QIOFR command sequence.

The following several tables present possible dummy clock cycle selections with respect to operating frequency. For one or more embodiments, additional tables may be utilized to show maximum clock frequency for each dummy clock cycle setting, although the scope of claimed subject matter is not limited in this respect. Configuration register 124 may be programmed with appropriate values from these tables depending on operating frequency and types of command sequences. Table 2 includes dummy clock cycle values for any start read address, and Table 3 may be utilized in a situation where the start address is aligned with a two-byte boundary. Table 4 includes dummy clock cycle values for start addresses that are aligned with a four-byte boundary. Of course, the values presented in these tables are merely examples for one or more embodiments, and the scope of claimed subject matter is not limited in these respects.

TABLE 2

Dummy Clock Cycle Settings For Any Start Address

| | | Number of Dummy Clock Cycles (Min) | | | | | |
|---|---|---|---|---|---|---|---|
| Operating Frequency (Max) | $t_{ck}$ (Min) | Read CFI (RCFI), Read Electronic Signature (RES), Read OTP (ROTP), Fast Read Data Bytes (FAST_READ) | Dual Output Fast Read Data Bytes (DOFR) | Dual I/O Fast Read Data Bytes (DIOFR) | Quad Output Fast Read Data Bytes (QOFR) | Quad I/O Fast Read Data Bytes (QIOFR) | Note |
| 56 MHz | 17.8 ns | 0[1] | 0[1] | 2 | 2 | 5 | [1]If streaming mode is enabled, minimum number is 1 |

TABLE 2-continued

Dummy Clock Cycle Settings For Any Start Address

| Operating Frequency (Max) | $t_{ck}$ (Min) | Read CFI (RCFI), Read Electronic Signature (RES), Read OTP (ROTP), Fast Read Data Bytes (FAST_READ) | Dual Output Fast Read Data Bytes (DOFR) | Dual I/O Fast Read Data Bytes (DIOFR) | Quad Output Fast Read Data Bytes (QOFR) | Quad I/O Fast Read Data Bytes (QIOFR) | Note |
|---|---|---|---|---|---|---|---|
| | | | | | | | in order to enter or exit streaming mode |
| 66 MHz | 15.2 ns | 1 | 1 | 3 | 3 | 6 | — |
| 86 MHz | 11.6 ns | 2 | 3 | 5 | 5 | 8 | — |
| 104 MHz | 9.6 ns | 3 | 5 | 7 | 7 | 10 | — |
| 104 MHz | 9.6 ns | 8 | 8 | 8 | 8 | 10 | Default |

TABLE 3

Dummy Clock Cycle Settings for Two-Byte Boundary Aligned Start Read Address

| Operating Frequency (Max) | $t_{ck}$ (Min) | Read CFI (RCFI), Read Electronic Signature (RES), Read OTP (ROTP), Fast Read Data Bytes (FAST_READ) | Dual Output Fast Read Data Bytes (DOFR) | Dual I/O Fast Read Data Bytes (DIOFR) | Quad Output Fast Read Data Bytes (QOFR) | Quad I/O Fast Read Data Bytes (QIOFR) | Note |
|---|---|---|---|---|---|---|---|
| 56 MHz | 17.8 ns | 0[1] | 0[1] | 2 | 0[1] | 3 | [1]If streaming mode is enabled, minimum number is 1 in order to enter or exit streaming mode |
| 66 MHz | 15.2 ns | 1 | 1 | 3 | 1 | 4 | — |
| 86 MHz | 11.6 ns | 2 | 2 | 4 | 3 | 6 | — |
| 104 MHz | 9.6 ns | 3 | 3 | 5 | 5 | 8 | — |
| 104 MHz | 9.6 ns | 8 | 8 | 8 | 8 | 10 | Default |

TABLE 4

Dummy Clock Cycle Settings for Four-Byte Boundary Aligned Start Read Address

| Operating Frequency (Max) | $t_{ck}$ (Min) | Read CFI (RCFI), Read Electronic Signature (RES), Read OTP (ROTP), Fast Read Data Bytes (FAST_READ) | Dual Output Fast Read Data Bytes (DOFR) | Dual I/O Fast Read Data Bytes (DIOFR) | Quad Output Fast Read Data Bytes (QOFR) | Quad I/O Fast Read Data Bytes (QIOFR) | Note |
|---|---|---|---|---|---|---|---|
| 56 MHz | 17.8 ns | 0[1] | 0[1] | 2 | 0[1] | 3 | [1]If streaming |

TABLE 4-continued

Dummy Clock Cycle Settings for Four-Byte Boundary Aligned Start Read Address

| Operating Frequency (Max) | $t_{ck}$ (Min) | Read CFI (RCFI), Read Electronic Signature (RES), Read OTP (ROTP), Fast Read Data Bytes (FAST_READ) | Dual Output Fast Read Data Bytes (DOFR) | Dual I/O Fast Read Data Bytes (DIOFR) | Quad Output Fast Read Data Bytes (QOFR) | Quad I/O Fast Read Data Bytes (QIOFR) | Note |
|---|---|---|---|---|---|---|---|
| | | | | | | | mode is enabled, minimum number is 1 in order to enter or exit streaming mode |
| 66 MHz | 15.2 ns | 1 | 1 | 3 | 1 | 4 | — |
| 86 MHz | 11.6 ns | 2 | 2 | 4 | 2 | 5 | — |
| 104 MHz | 9.6 ns | 3 | 3 | 5 | 3 | 6 | — |
| 104 MHz | 9.6 ns | 8 | 8 | 8 | 8 | 10 | Default |

As discussed above, for one or more embodiments, serial flash memory 200 may support a streaming mode to perform read operations without having to include a command code before the address, resulting in a reduction of eight clock cycles for at least some read command sequences. For an embodiment, the streaming mode may be available for a number of read commands, such as, for example, Fast Read, DOFR, DIOFR, QOFR, and QIOFR.

Configuration register 124 may also used to enable or disable the streaming mode. In particular, as can be seen in Table 1, field CR3 may be cleared to a value of '0', for this example embodiment, to enable the streaming mode. Note that enabling the streaming mode by itself does not cause the memory to perform streaming read operations. Rather, for an embodiment, the streaming mode may be entered by the techniques described below in connection with FIGS. 4-7. In general, for an embodiment, an appropriate value may be transmitted to a first data input/output terminal of the flash memory during the first dummy clock cycle to cause the memory to enter the streaming mode. Of course, embodiments in accordance with claimed subject matter are not limited to transmitting the appropriate value during the first dummy clock cycle, as other embodiments may transmit and/or receive the value during dummy clock cycles other than the first dummy clock cycle.

Configuration register 124 may also be used to define the type of bus accesses that the memory may perform. Table 1 indicates that the possible types of read accesses may include continuous reads, where all the bytes are read sequentially, and 16-Byte or 32-Byte wrap reads, where the output data wrap within a 16-Byte or 32-Byte boundary starting from the three-byte address issued after the command code. The types of read command accesses are described in table 5, below. Note that although table 5 depicts 16 and 32-Byte read accesses, other embodiments may extend the wrapping schemes depicted in table 5 to 64-Byte read accesses and/or read accesses of other lengths. Embodiments in accordance with claimed subject matter are not limited to the particular length accesses depicted in the tables herein.

TABLE 5

Read Types Definitions

| Start Address | 16-Byte wrap | 32-Byte wrap | Continuous |
|---|---|---|---|
| 0 | 0-1-2-3-4-5-6-7-8-9-10-11-12-13-14-15 | 0-1-2-3-4-5-6-7-...-28-29-30-31 | 0-1-2-3-4-5-6-7-8-9-10-11-12-13-14-15-... |
| 1 | 1-2-3-4-5-6-7-8-9-10-11-12-13-14-15-0 | 1-2-3-4-5-6-7-8-...-29-30-31-0 | 1-2-3-4-5-6-7-8-9-10-11-12-13-14-15-16-... |
| 2 | 2-3-4-5-6-7-8-9-10-11-12-13-14-15-0-1 | 2-3-4-5-6-7-8-9-...-30-31-0-1 | 2-3-4-5-6-7-8-9-10-11-12-13-14-15-16-17-... |
| 3 | 3-4-5-6-7-8-9-10-11-12-13-14-15-0-1-2 | 3-4-5-6-7-8-9-10-...-31-0-1-2 | 3-4-5-6-7-8-9-10-11-12-13-14-15-16-17-18-... |
| ... | ... | ... | ... |
| 11 | 11-12-13-14-15-0-1-2-3-4-5-6-7-8-9-10 | 11-12-13-14-15-16-17-...-7-8-9-10 | 11-12-13-14-15-16-17-18-19-20-21-22-23-24-25-26-... |
| 12 | 12-13-14-15-0-1-2-3-4-5-6-7-8-9-10-11 | 12-13-14-15-16-17-18-...-8-9-10-11 | 12-13-14-15-16-17-18-19-20-21-22-23-24-25-26-27- |

TABLE 5-continued

Read Types Definitions

| Start Address | 16-Byte wrap | 32-Byte wrap | Continuous |
|---|---|---|---|
| 13 | 13-14-15-0-1-2-3-4-5-6-7-8-9-10-11-12 | 13-14-15-16-17-18-19-...-9-10-11-12 | 13-14-15-16-17-18-19-20-21-22-23-24-25-26-27-28-... |
| 14 | 14-15-0-1-2-3-4-5-6-7-8-9-10-11-12-13 | 14-15-16-17-18-19-20-...-10-11-12-13 | 14-15-16-17-18-19-20-21-22-23-24-25-26-27-28-29-... |
| 15 | 15-0-1-2-3-4-5-6-7-8-9-10-11-12-13-14 | 15-16-17-18-19-20-21-...-11-12-13-14 | 15-16-17-18-19-20-21-22-23-24-25-26-27-28-29-30-... |
| 16 | ... | 16-17-18-19-20-21-22-...-12-13-14-15 | 16-17-18-19-20-21-22-23-24-25-26-27-28-29-30-31-... |
| 17 | ... | 17-18-19-20-21-22-23-...-13-14-15-16 | 17-18-19-20-21-22-23-24-25-26-27-28-29-30-31-32-... |
| 18 | ... | 18-19-20-21-22-23-24-...-14-15-16-17 | 18-19-20-21-22-23-24-25-26-27-28-29-30-31-32-33-... |
| 19 | ... | 19-20-21-22-23-24-25-...-15-16-17-18 | |
| ... | ... | ... | ... |
| 28 | ... | 28-29-30-31-0-1-2-3-...-20-21-22-23-24-25-26-27 | 28-29-30-31-32-33-34-35-36-37-38-39-40-41-42-43-... |
| 29 | ... | 29-30-31-0-1-2-3-4-...-22-23-24-25-26-27-28 | 29-30-31-32-33-34-35-36-37-38-39-40-41-42-43-44-... |
| 30 | ... | 30-31-0-1-2-3-4-5-...-22-23-24-25-26-27-28-29 | 30-31-32-33-34-35-36-37-38-39-40-41-42-43-44-45-... |
| 31 | ... | 31-0-1-2-3-4-5-6-...-22-23-24-25-26-27-28-29-30 | 31-32-33-34-35-36-37-38-39-40-41-42-43-44-45-46-... |

For an embodiment, serial flash memory 200 may include an Enhanced Configuration Register 125, which may be used to define output driver strength.

Upon a reset or power-up, serial flash memory device 200 may be configured with a default value for the driver strength at Vcc/2 of 30 Ohm (ECR2-ECR0=100) with a load of 30 pF. Enhanced configuration register 125 may be set using a Write to Enhanced Configuration Register (WRECR) command. Enhanced configuration register 125 organization is described in Table 6:

TABLE 6

Enhanced Configuration Register

| Bit | Parameter | Value | Description | Note |
|---|---|---|---|---|
| ECR7: ECR3 | Reserved | Reserved | Reserved | May serve as streaming mode entry field in alternative embodiment |
| ECR2-ECR0 | Output Driver Strength | 000<br>001<br>010<br>011<br>100 (Default)<br>101<br>110<br>111 | Reserved<br>90 (load 10 pF)<br>60 (load 15 pF)<br>45 (load 20 pF)<br>30 (load 30 pF)<br>20 (load 35 pF)<br>15 (load 40 pF)<br>Reserved | Impedance [Ohm] at Vcc/2 |

For one or more embodiments, the three reserved bits of enhanced configuration register 125 may be used as an alternative technique for entering a streaming mode for a number of specified read command sequences:

000 Enter Streaming Mode with FAST_READ
    001 Enter Streaming Mode with DOFR
    010 Enter Streaming Mode with DIOFR
    011 Enter Streaming Mode with QOFR
    100 Enter Streaming Mode with QIOFR
    101 Reserved
    110 Reserved
    111 Streaming Mode Disabled (Default at power-up and after Reset)

For this example technique for entering streaming mode, processor 110 may write the appropriate value into the reserved bits of enhanced configuration register 125, and in response, memory 200 may recognize that if a particular command code matching the value written to enhanced configuration register 125 is received, the memory may enter streaming mode.

In the above technique for entering streaming mode, it may be possible to exit from the streaming mode with a RESET# low pulse or with a power-down/power-up sequence. For another embodiment, an alternative technique for exiting from streaming mode is with a special Unlock Command Sequence made of several short (4 clock cycles) command sequences, such as:

1. S# low, code 5h, S# high
    2. S# low, code Ah, S# high
    3. S# low, code 5h, S# high
    4. S# low, code Ah, S# high Of course, the configuration register and the enhanced configuration register configurations and organizations discussed above are merely examples, and a wide range of alternative embodiments are possible. The scope of claimed subject matter is not limited to the specific detail of the example embodiments described herein.

As discussed above, one technique for enhancing throughput for a serial flash memory device is to provide a streaming mode for data read operations. For example embodiment described herein, the streaming mode may allow computing platform 100 to perform read operations from serial flash memory 200 without needing to transmit a command code at the beginning of a command sequence. As will be seen in FIGS. 4-7, discussed below, the DQ0 value during the first dummy clock cycle of a read command sequence may be used to enter or exit the streaming mode. For an embodiment, a value of '0' on DQ0 during the first dummy clock cycle may indicate that memory 200 is to enter streaming mode. Subsequent reads may only be of the same type if no command code is provided. By eliminating the command code, eight clock cycles may be saved for every read command while in streaming mode.

Also for an embodiment, a '1' value on DQ0 during the first dummy clock cycle will indicate to memory 200 to exit the streaming mode, and subsequent operations may operate under normal command protocols.

Figure 4:
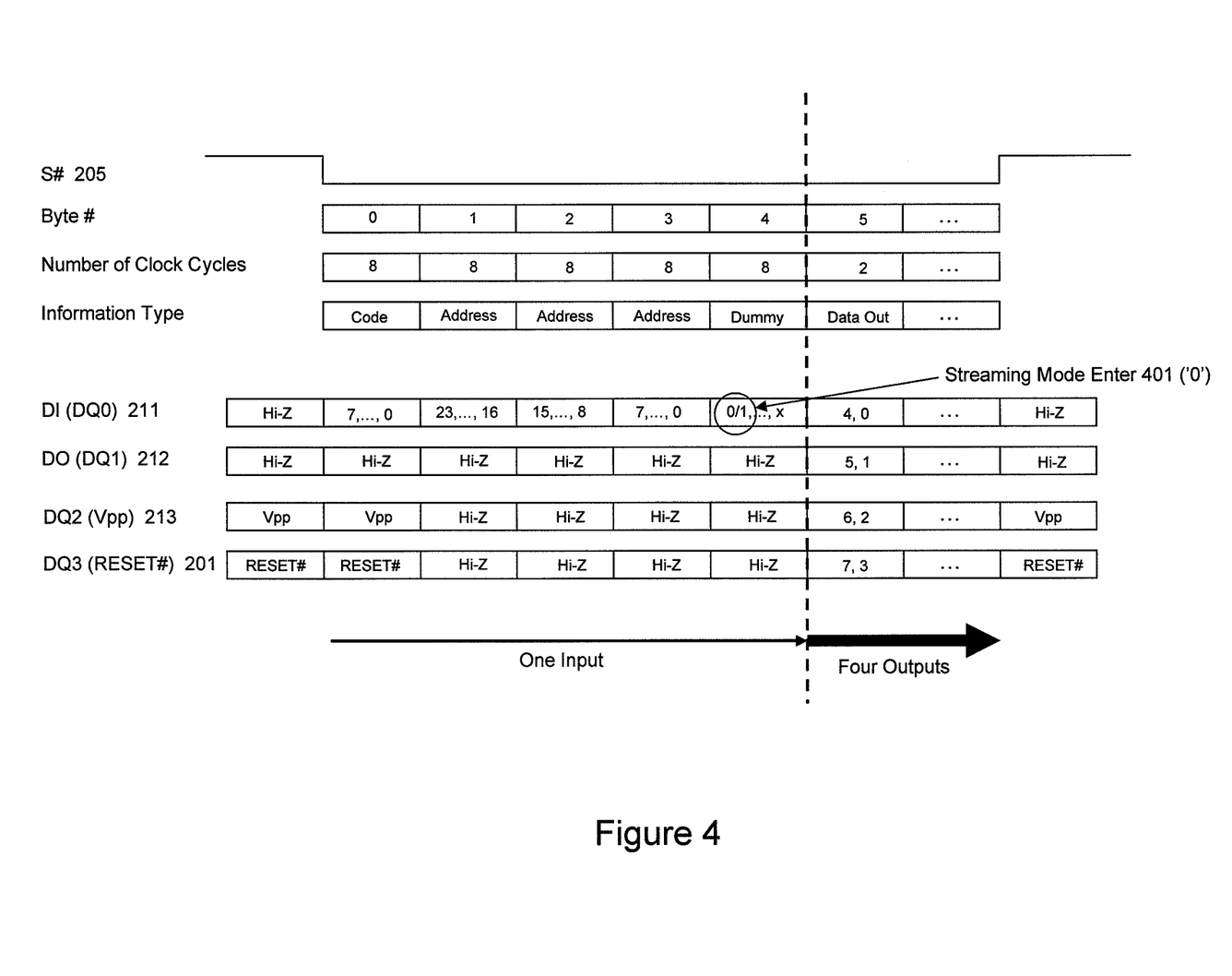
FIG. 4 is a diagram of an example embodiment of a quad output fast read operation.

FIG. 4 is a diagram of an example embodiment of a quad output fast read operation, including an entry to streaming mode. At byte 0, S# becomes asserted by processor 110, indicating that processor 110 is acting as the master and memory 200 is acting as slave, for this example, and a command code is presented by the processor to DQ0 211. For this particular command sequence, there is a single input on DQ0 211, and there are four outputs on terminals DQ0 211, DQ1 212, DQ2 213, and DQ3 201. At bytes 1-3, an address is presented by processor 110 to DQ0 211. For this example, at byte 4, during the first dummy clock cycle of eight dummy clock cycles for this example command sequence, a streaming mode enter signal 401 with a value '0' is presented by processor 110 to terminal DQ0 211, indicating to control unit 126 that subsequent quad output fast read operations may be presented to serial flash memory 200 without a command code, as is demonstrated in FIG. 5, discussed below. For the present example of FIG. 4, eight dummy clock cycles are used and data is transmitted from the four output terminals to the processor during byte 5. S#205 is deasserted by processor 110, indicating that the command sequence has been completed.

Figure 5:
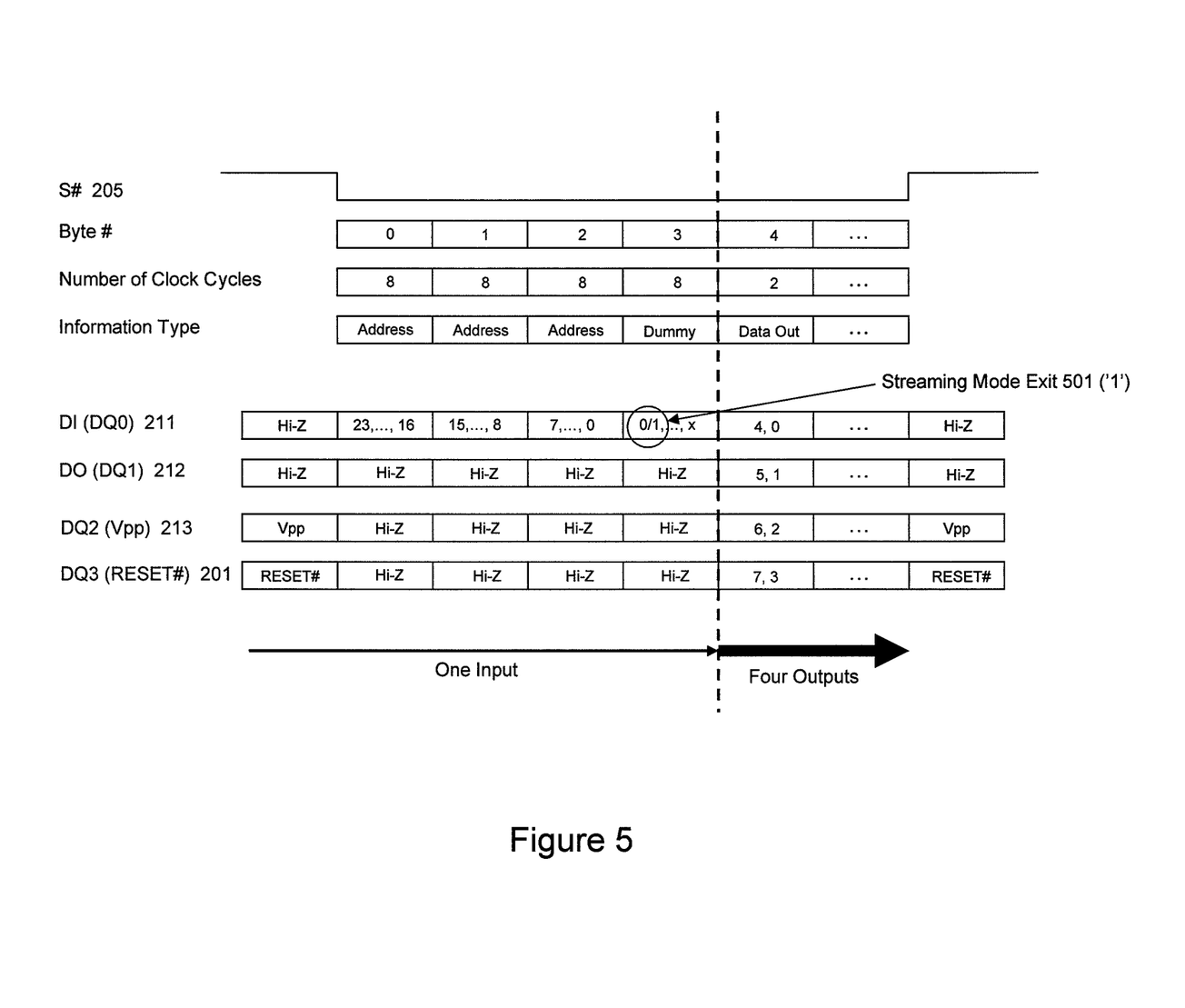
FIG. 5 is a diagram of an example embodiment of a quad output fast read operation in streaming mode.

FIG. 5 is a diagram of an example embodiment of a quad output fast read operation in streaming mode. Because this example command sequence is in streaming mode, no command code is presented to DQ0 211 at the beginning of the sequence. Rather, the sequence begins with the address. For this example embodiment, the input information is received over a single input terminal DQ0 211, and output data is transmitted by four output terminals DQ0 211, DQ1 212, DQ2 213, and DQ3 201.

For this example command sequence, although the sequence began with memory 200 in streaming mode, at byte 3, during the first dummy clock cycle of eight dummy clock cycles for this example command sequence, a streaming mode exit 501 value '1' is presented to DQ0 211 by processor 110, indicating to memory 200 that subsequent quad output fast read command sequences will not be in streaming mode, but will rather begin with a command code. As demonstrated by FIG. 5, by eliminating the command code, eight clock cycles may be saved for each read operation, and read throughput is significantly improved.

Figure 6:
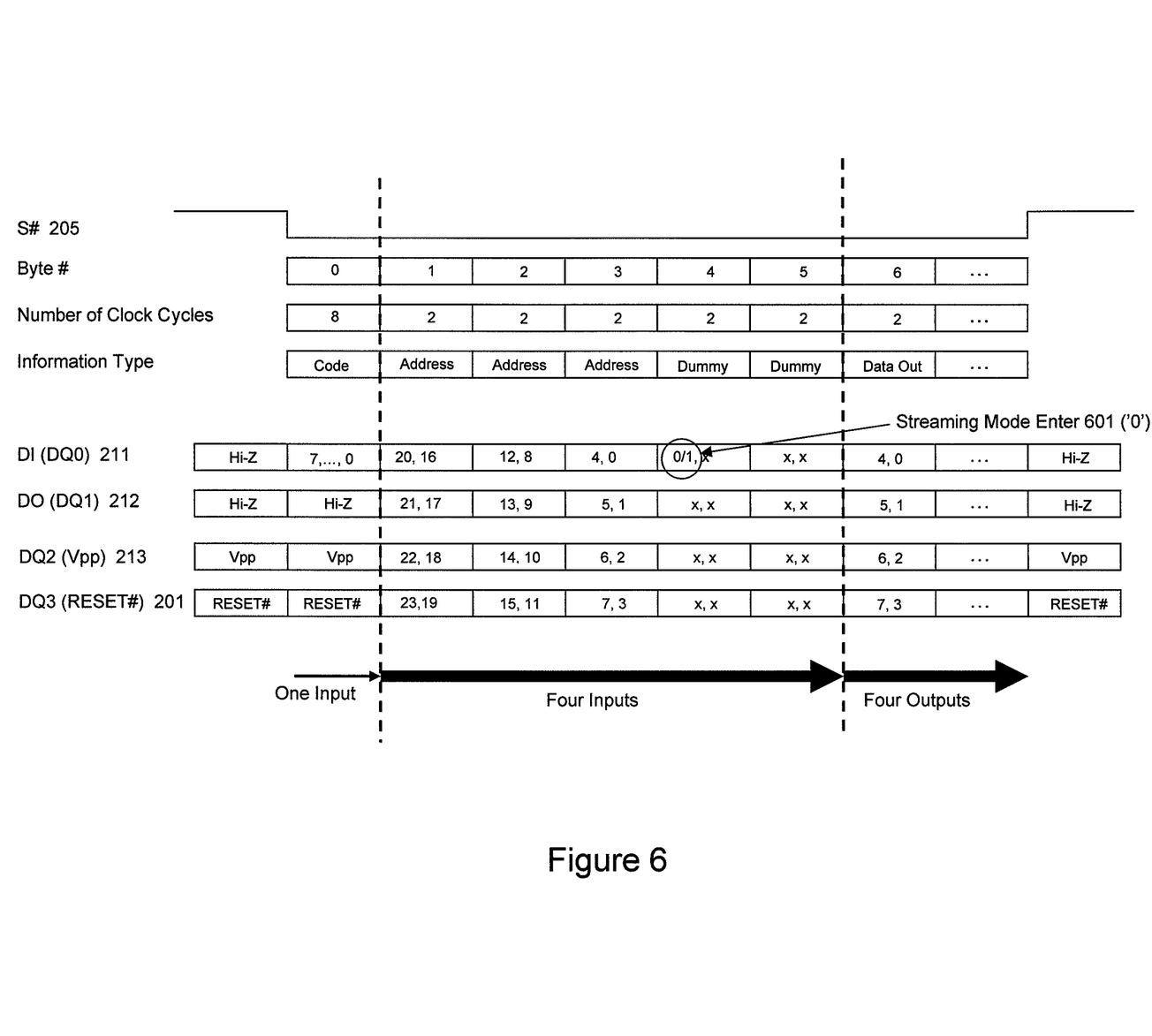
FIG. 6 is a diagram of an example embodiment of a quad input/quad output fast read operation.

FIG. 6 is a diagram of an example embodiment of a quad input/quad output fast read operation. This example also demonstrates an entry to streaming mode, by way of the streaming mode enter 601 value '0' presented by processor 110 to DQ0 211 at byte 4. At byte 0, S# becomes asserted by processor 110, indicating that processor 110 is acting as the master and memory 200 is acting as slave, for this example, and a command code is presented by the processor to DQ0 211. For this particular command sequence, there is a single input on DQ0 211 to shift in the command code. Although this example is similar to that of FIG. 4 in some ways, the example of FIG. 5 differs in that four input terminals are used to shift in the address bytes. Specifically, for this example embodiment, the address bytes are received during bytes 1-3 at DQ0 211, DQ1 212, DQ2 213, and DQ3 201. Output data is transmitted over the same four output terminals DQ0 211, DQ1 212, DQ2 213, and DQ3 201.

For this example, at byte 4, during the first dummy clock cycle of four dummy clock cycles for this example command sequence, a streaming mode enter signal 601 with a value '0' is presented by processor 110 to terminal DQ0 211, indicating to control unit 126 that subsequent quad output fast read operations may be presented to serial flash memory 200 without a command code, as is demonstrated in FIG. 7, discussed below. For the present example of FIG. 6, two dummy clock cycles are used and data is transmitted from the four output terminals to the processor during byte 6. S#205 is deasserted by processor 110, indicating that the command sequence has been completed.

Figure 7:
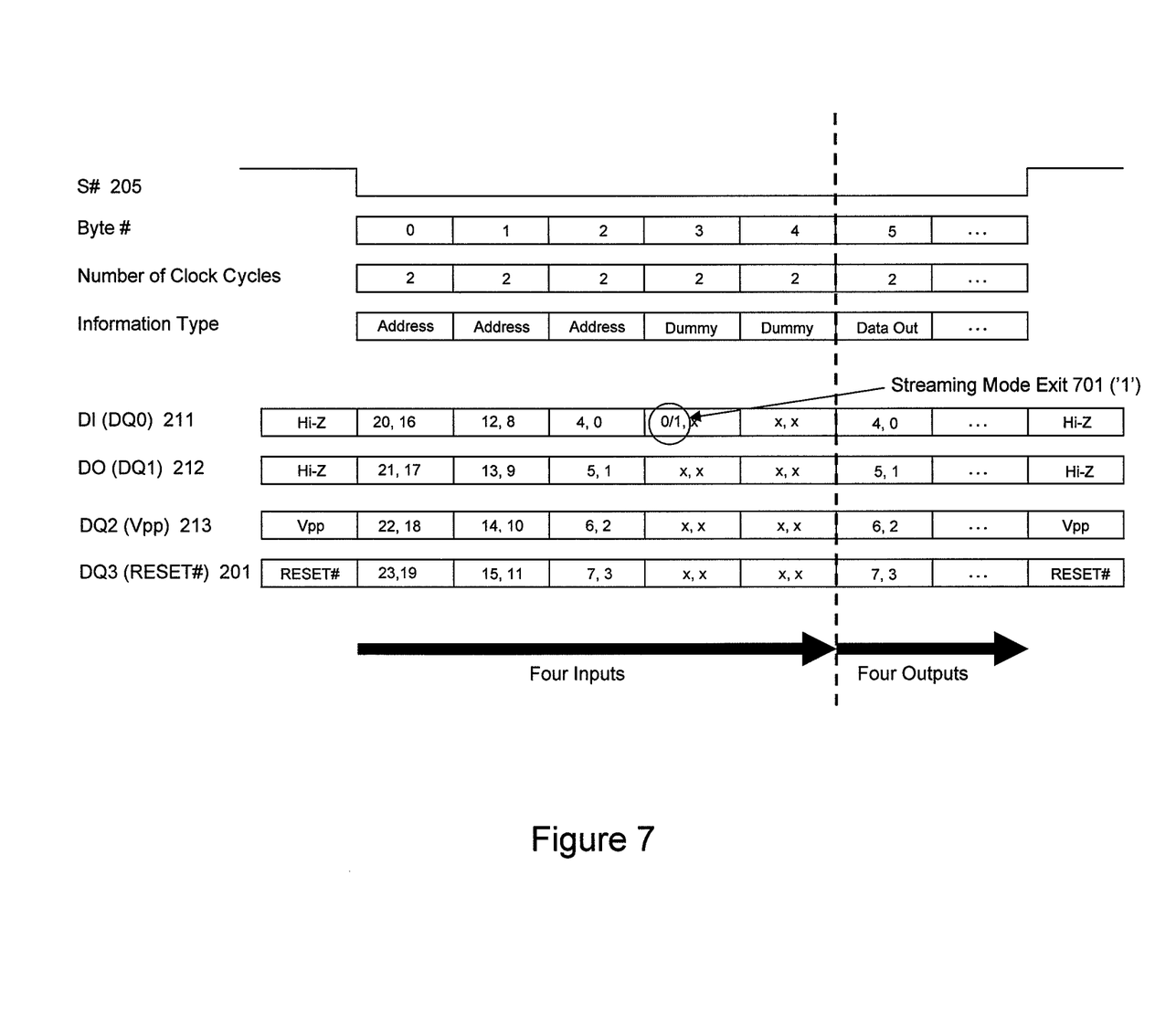
FIG. 7 is a diagram of an example embodiment of a quad input/quad output fast read operation in streaming mode.

FIG. 7 is a diagram of an example embodiment of a quad input/quad output fast read operation in streaming mode. Because this example command sequence is in streaming mode, no command code is presented to DQ0 211 at the beginning of the sequence. Rather, the sequence begins with the address. For this example embodiment, the input information is received over a four terminals, DQ0 211, DQ1 212, DQ2 213, and DQ3 201. Output data is transmitted over the same four output terminals DQ0 211, DQ1 212, DQ2 213, and DQ3 201.

For this example command sequence, although the sequence began with memory 200 in streaming mode, at byte 3, during the first dummy clock cycle of four dummy clock cycles for this sequence, a streaming mode exit 701 value '1' is presented to DQ0 211 by processor 110, indicating to memory 200 that subsequent quad output fast read command sequences will not be in streaming mode, but will rather begin with a command code. As demonstrated by FIG. 7, as with FIG. 5, the elimination of the command code results in a savings of eight clock cycles for read operations, and read throughput may be significantly improved.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

What is claimed is:

1. A method of configuring a serial flash memory device, the method comprising:
   retrieving a dummy clock cycle value and a streaming mode value from a configuration register of the serial flash memory device;
   determining whether or not to operate in a streaming mode based on the streaming mode value;
   configuring a number of dummy clock cycles to provide based at least partly on the dummy clock cycle value;
   when in the streaming mode, providing don't care data for the number of dummy clock cycles followed by read data in response to an address without a read command, wherein the read data corresponds to data stored at that address; and
   when not in the streaming mode, providing don't care data for the number of dummy clock cycles followed by read data in response to a read command with an address, wherein the read data corresponds to data stored at that address.

2. The method of claim 1, further comprising:
   receiving the dummy clock cycle value; and
   receiving a command to write the dummy clock cycle value to the configuration register.

3. The method of claim 1, further comprising initializing the dummy clock cycle value stored in the configuration register to a default value that is compatible with a maximum allowed frequency of the serial flash memory device.

4. The method of claim 1, further comprising configuring the number of dummy clock cycles to provide based on the dummy clock cycle value and a type of read command.

5. The method of claim 4, wherein the type of read command corresponds to one of Read Common Flash memory Interface (RCFI), Read Electronic Signature (RES), Read One-Time Programmed (ROTP), Fast Read Data Bytes (Fast Read), Dual Output Fast Read Data Bytes (DOFR), Dual I/O Fast Read Data Bytes (DIOFR), Quad Output Fast Read Data Bytes (QOFR) and Quad I/O Fast Read Data Bytes (QIOFR).

6. The method of claim 1, further comprising configuring the number of dummy clock cycles to provide based on the dummy clock cycle value, a type of read command, and a frequency of operation.

7. An apparatus comprising:
   a configuration register of a serial flash memory device configured to store a dummy clock cycle value and a streaming mode value; and
   a control unit configured to:
     determine whether or not to operate in a streaming mode based on the streaming mode value;
     configure a number of dummy clock cycles to provide based at least partly on the dummy clock cycle value;
     provide don't care data for the number of dummy clock cycles followed by read data in response to an address without a read command when in the streaming mode, wherein the read data corresponds to data stored at that address; and
     provide data with a selected don't care data for the number of dummy clock cycles followed by read data in response to a read command with an address when not in the streaming mode, wherein the read data corresponds to data stored at that address.

8. The apparatus of claim 7, wherein the control unit is further configured to receive the dummy clock cycle value, and in response to a command to write the dummy clock cycle value to the configuration register, to initiate storage of the dummy clock cycle value to the configuration register.

9. The apparatus of claim 7, wherein the control unit is further configured to initialize the dummy clock cycle value stored in the configuration register to a default value that is compatible with a maximum allowed frequency of the serial flash memory device.

10. The apparatus of claim 7, wherein the control unit is further configured to configure the number of dummy clock cycles to provide based on the dummy clock cycle value and a type of read command.

11. The apparatus of claim 10, wherein the type of read command corresponds to one of Read Common Flash memory Interface (RCFI), Read Electronic Signature (RES), Read One-Time Programmed (ROTP), Fast Read Data Bytes (Fast Read), Dual Output Fast Read Data Bytes (DOFR), Dual I/O Fast Read Data Bytes (DIOFR), Quad Output Fast Read Data Bytes (QOFR) and Quad I/O Fast Read Data Bytes (QIOFR).

12. The apparatus of claim 7, wherein the control unit is further configured to configure the number of dummy clock cycles to provide based on the dummy clock cycle value, a type of read command, and a frequency of operation.

13. An apparatus comprising:
   a processor; and
   a serial flash memory device coupled to the processor, the serial flash memory device comprising:
     a configuration register of a serial flash memory device configured to store a dummy clock cycle value and a streaming mode value; and
     a control unit configured to:
       determine whether or not to operate in a streaming mode based on the streaming mode value;
       configure a number of dummy clock cycles to provide based at least partly on the dummy clock cycle value;
       provide don't care data for the number of dummy clock cycles followed by read data in response to an address without a read command when in the streaming mode, wherein the read data corresponds to data stored at that address; and
       provide don't care data for the number of dummy clock cycles followed by read data in response to a read command with an address when not in the streaming mode, wherein the read data corresponds to data stored at that address.

14. The apparatus of claim 13, wherein the control unit is further configured to receive the dummy clock cycle value, and in response to a command to write the dummy clock cycle value to the configuration register, to initiate storage of the dummy clock cycle value to the configuration register.

15. The apparatus of claim 13, wherein the control unit is further configured to initialize the dummy clock cycle value stored in the configuration register to a default value that is compatible with a maximum allowed frequency of the serial flash memory device.

16. The apparatus of claim 13, wherein the control unit is further configured to configure the number of dummy clock cycles to provide based on the dummy clock cycle value and a type of read command.

17. The apparatus of claim 16, wherein the type of read command corresponds to one of Read Common Flash memory Interface (RCFI), Read Electronic Signature (RES), Read One-Time Programmed (ROTP), Fast Read Data Bytes (Fast Read), Dual Output Fast Read Data Bytes (DOFR), Dual I/O Fast Read Data Bytes (DIOFR), Quad Output Fast Read Data Bytes (QOFR) and Quad I/O Fast Read Data Bytes (QIOFR).

18. The apparatus of claim 13, wherein the control unit is further configured to configure the number of dummy clock cycles to provide based on the dummy clock cycle value, a type of read command, and a frequency of operation.

* * * * *